Patented Jan. 25, 1949

2,460,043

UNITED STATES PATENT OFFICE 2,460,043

PHOSPHONIC ACID ESTERS

Wilber O. Teeters, River Edge, N. J., assignor to Allied Chemical & Dye Corporation, New York, N. Y., a corporation of New York No Drawing. Application August 29, 1945,
Serial No. 613,428

9 Claims. (Cl. 260—461)

This invention relates to a new and useful class of chemical compounds and to a process of preparing them.

It is an object of the invention to provide a novel class of chemical compounds particularly adapted for use as antioxidants, e. g., in lubricating oils to inhibit oxidation and improve the lubricating properties thereof, plasticizers and softeners for resins and synthetic elastomers, for example, GR–A, GR–I and GR–S, as solvents, in preparation of surface active agents, and various other purposes. It is a further object to provide a novel process of preparing the preferred compounds of the invention.

The compounds to which the invention relates are a special class of phosphonic acid esters and thioesters of the following general formulas:

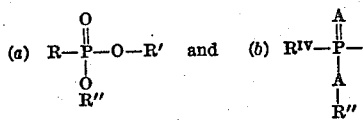

in which R is a radical selected from the class consisting of ac-indenyl radicals and hydrogenated ac-indenyl radicals and their homologs; R' and R'' are radicals selected from the class consisting of hydrocarbon radicals and chlorinated hydrocarbon radicals; $R^{IV}$ represents a radical selected from the group consisting of ac-indenyl radicals and their homologs; and A represents a bivalent radical selected from the class consisting of —O— and —S—. The preferred compounds are esters of the above formula in which A is oxygen. The radical R of these preferred esters may be hydrogenated.

The accompanying formula, in which R' and R'' are the same or different hydrocarbon or chlorinated hydrocarbon radicals, exemplifies the unhydrogenated form of the radical R:

Diesters of 2-indene phosphonic acid.

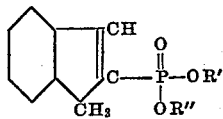

The aryl group of the radical R may be further substituted by one or more organic or inorganic substituents, e. g., 1 or more methyl or other hydrocarbon radicals, or other groups such as methoxyl, chlorine and bromine. That is R is a hydrocarbon radical such as the indenyl radical, or a homolog thereof.

The preferred unhydrogenated compounds of the invention may be prepared by reacting phosphorus pentachloride with aryl compounds such as indene, and reacting the resultant reaction products with appropriate monohydroxy alcohols or phenols in the presence of a hydrogen chloride-accepting agent which removes hydrogen chloride from the reaction. Alternatively, the reaction product of the phosphorus pentachloride and the aryl compound may be reacted with an alkyl carboxylic acid, an alkyl carboxylic acid anhydride, e. g., acetic acid or acetic anhydride, or sulfur dioxide, to form the corresponding phosphonyl dichlorides, and these dichlorides then reacted with monohydroxy alcohols and phenols in the presence of a hydrogen chloride-accepting agent to form the desired esters.

Thioesters of the formula:

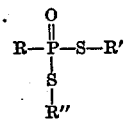

may be prepared by reacting phosphonyl dichlorides prepared as described in the preceding paragraph with the thioanalogs of monohydroxy alcohols and phenols in the presence of a hydrogen chloride-accepting agent.

Thioesters of the formula:

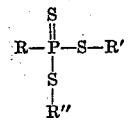

may be prepared by reacting the phosphorus pentachloride-aryl compound reaction products hereinabove described with the thioanalogs of alcohols and phenols in the presence of a hydrogen chloride-accepting agent. The above reactions involved in preparation of the esters and thioesters may be carried out at temperatures within the range of from about 0° C. to 150° C.

The reaction between the aryl compound and the phosphorus pentachloride may be carried out in the absence of a solvent or in the presence of a solvent or mixture of solvents inert to the reactants, e. g. inert hydrocarbons, which may be of aromatic alicyclic or aliphatic nature, carbon disulfide, ethers and chlorinated hydrocarbons such as carbon tetrachloride and dichloropentane. Similar solvents may be employed in the reactions involving the alcohols, phenols and their thioanalogs.

The aryl compound reacted with phosphorus pentachloride may be employed in substantially pure form or fractions of commercially available oils containing, say 25% or more by weight of such compounds may be used. For example, oils obtained in the distillation of coal and in the production of water gas, such as coke oven light oil and drip oil, which oils may contain varying but substantial proportions of indene, and homologs thereof, may be fractionated and appropriate fractions containing the desired compounds employed in the reaction with phosphorus pentachloride.

In carrying out the invention, monohydroxy compounds of the following types may be employed: monohydroxy alcohols including aliphatic, alicyclic and aromatic monohydric alcohols which may be primary, secondary or tertiary, and monohydroxy phenols such as phenol, the cresols and xylenols. Such monohydroxy compounds may contain one or more organic or inorganic substituents, e. g., chlorine. The thioanalogs of such monohydroxy compounds may be utilized in making the thioesters. As specific examples of such compounds there may be mentioned methanol, ethanol, isopropanol, butanol, hexanol, heptyl alcohol, lauryl alcohol, cetyl alcohol, benzyl alcohol, ethylene chlorhydrin, cyclohexanol and its homologs, phenol, the cresols, the xylenols, and the thioanalogs of these compounds. Thus R' and R" in the above general formulae are radicals of organic monohydroxy compounds or their thioanalogs.

As the hydrogen chloride-accepting agent, any compound which forms a stable reaction product with hydrogen chloride but does not react with other materials present in the reaction mixture and which is readily separable from the desired esters may be utilized. The preferred hydrogen chloride-accepting agent is pyridine. Other tertiary amines, such as pyridine homologs, N,N-dimethylaniline, quinoline and trimethylamine, and also other compounds such as carbonates of alkali and alkaline earth metals, for example sodium carbonate and calcium carbonate may be employed as hydrogen chloride-accepting agents.

The following examples are illustrative of the preparation of unhydrogenated compounds of the invention: In Example 1 parts are given by weight:

*Example 1.*—About 104 parts of finely pulverized phosphorus pentachloride were suspended in about 165 parts of petroleum ether, and about 58 parts of indene were added slowly to the suspension while stirring. After about 3 hours, the solid reaction product (2-indenyl phosphorus tetrachloride), which formed, was separated from the reaction mixture by filtration and was suspended in about 165 parts of petroleum ether. About 128 parts of 1-butanol and 99 parts of pyridine were slowly added simultaneously to the suspension while agitating and agitation was continued for about 2 hours after addition of all the butanol and pyridine. The pyridine hydrochloride, which formed during the reaction, was separated from the reaction mixture by filtration. The filtrate was then steam distilled to separate the petroleum ether and unreacted materials, and dibutyl 2-indene phosphonate was recovered as the residue of the distillation. This ester is a liquid having a boiling point of 105°–115° C. under an absolute pressure of 3 mm. of mercury.

*Example 2.*—2-indene phosphonyl dichloride was prepared by dissolving 2-indenyl phosphorus tetrachloride prepared as described in Example 1 in an excess of sulfur dioxide, evaporating the excess sulfur dioxide, dissolving the residue in petroleum ether, and cooling the solution to about −50° C. to crystallize the 2-indene phosphonyl dichloride. One mol of the crystalline 2-indene phosphonyl dichloride was added to 6 mols of cyclohexanol and the mixture was stirred for 2 hours while cooling with ice water. Two mols of pyridine were then added to the mixture which was maintained, while agitating, at 70°–80° C. for 2 hours. The resultant mixture was then cooled and the solid pyridine hydrochloride was removed by filtration. The filtrate was washed with a 5% aqueous sodium hydroxide solution, then with water, and was then subjected to steam distillation to remove unreacted materials. The residue was dissolved in petroleum ether and the solution was cooled below 0° C. Crystalline dicyclohexyl 2-indene phosphonate having a melting point of about 87° C. separated from the solution.

*Example 3.*—One mol of 2-indene phosphonyl dichloride, prepared as described in Example 2, was mixed with 1 mol of cyclohexanol and the mixture was stirred and maintained at 65°–70° C. for 1 hour. The mixture was then allowed to stand at room temperature until a crystalline product formed which was separated by filtration. The product was monocyclohexyl 2-indene-phosphonyl monochloride. One mol of this product was dissolved in a solvent constituted of equal parts by volume of petroleum ether and benzene, and 2 mols of butanol were added to the mixture. The resultant mixture was stirred and refluxed while 2 mols of pyridine were added gradually and the refluxing and stirring were continued for about 1 hour. The mixture was then cooled, filtered to separate the pyridine hydrochloride which had formed, and the filtrate was washed with water, then with 5% aqueous caustic alkali solution and again with water, and the washed filtrate was steam distilled. The distillation residue was diluted with petroleum ether and crystalline butyl cyclohexyl 2-indene phosphonate having a melting point of 85°–87° C. separated. This mixed diester is soluble in benzene, substantially insoluble in petroleum ether, and is soluble to some extent in lubricating oils.

The following example is illustrative of preparation of thioesters of the formula:

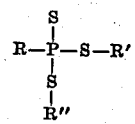

*Example 4.*—To 57 parts by weight of n-butyl mercaptan were slowly added 45 parts by weight of 2-indenylphosphorus tetrachloride. The reaction mixture was stirred, heated to 70° C. and excess pyridine was added. The heating was continued for ½ hour. The reaction mixture was then extracted with benzene, washed with dilute aqueous sodium hydroxide solution, dried, and the benzene distilled off under vacuum. The residue of the distillation contained di-(butylthiol)-2-indenethiono-phosphonate.

Thioesters of the formula:

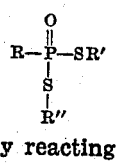

may be prepared by reacting dichlorides of the formula:

with mercaptans by procedures analogous to those of Examples 2, 3 and 4.

Mixed esters and thioesters may be made by reacting a mixture of two or more of the desired alcohols or phenols or their thioanalogs with the reaction product of phosphorus pentachloride and an aryl compound such as indene or styrene in the presence of a hydrogen chloride-accepting agent. Mixed esters and thioesters may also be made by reacting a mixture of monohydroxy alcohols or phenols or their thioanalogs with an appropriate dichloride such as 2-indene phosphonyl dichloride in the presence of a hydrogen chloride-accepting agent. The mixed esters and thioesters made in this manner ordinarily contain substantial amounts of homogeneous esters. For example, a mixture of phenyl cyclohexyl 2-indene phosphonate, diphenyl 2-indene phosphonate and dicyclohexyl 2-indene phosphonate can be made by reacting 2-indenyl phosphorus tetrachloride or 2-indene phosphonyl dichloride with a mixture of cyclohexanol and phenol in the presence of pyridine.

The hydrogenated compounds of the invention are made by partially or completely hydrogenating the radical R of the unhydrogenated esters of acids of the formula:

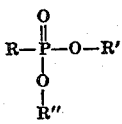

In the partially hydrogenated compounds the ethylenic double bond of the radical R is saturated, and in the completely hydrogenated compounds all of the double bonds of the radical R are saturated. Hydrogenated compounds falling within the scope of the invention may be exemplified as follows:

Partially hydrogenated diesters of 2-indene phonphonic acid.

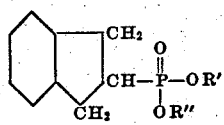

Completely hydrogenated diesters of 2-indene phosphonic acid.

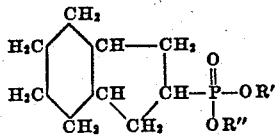

The hydrogenated compounds may be prepared by hydrogenating the radical R of the unhydrogenated compounds by conventional hydrogenation procedures in the liquid phase at a temperature of from 25° to 200° C. under hydrogen pressure of 1 to 100 atmospheres in the presence of a hydrogenation catalyst such as nickel, copper chromite, platinum or palladium catalyst. For effecting partial hydrogenation, i. e., hydrogenation of only the ethylenic double bond of the radical R, the hydrogenation may be discontinued at this point or a selective catalyst such as copper chromite may be employed. When catalysts of the Raney nickel or copper chromite types are utilized, hydrogenation temperatures and pressures within the ranges of 100° to 200° C. and 50 to 150 atmospheres are preferably employed. When catalysts such as palladium and platinum are utilized, lower temperatures and pressures within the ranges of 25° to 100° C. and 15 to 50 pounds per square inch are preferably employed. If it is desired to completely hydrogenate the esters, a catalyst such as nickel, platinum or palladium which catalyzes hydrogenation of the benzene ring is employed and the hydrogenation is continued until complete hydrogenation is effected. When it is desired to hydrogenate only the ethylenic double bond, a catalyst, such as copper chromite, capable of functioning selectively for this purpose may be employed or a catalyst capable of effecting saturation of all of the double bonds of the radical R may be employed and the hydrogenation discontinued when the ethylenic double bond is saturated.

*Example 5.*—89 parts by weight of dibutyl-2-indene phosphonate dissolved in cyclohexane and 15 parts by weight of Raney nickel catalyst were charged into a stainless steel bomb. The charge was subjected to hydrogen pressure of 1500 pounds per square inch at 25° C. and hydrogenation was conducted at 100° to 200° C. After 2.5 hours it was found that 47% of the dibutyl-2-indene phosphonate was converted to dibutyl-2-indane phosphonate of the formula:

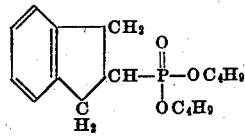

Thus, it will be seen the invention provides a novel class of esters of phosphonic acids, which compounds possess properties which render them valuable for various purposes such as anti-oxidants, e. g. in lubricating oils to inhibit oxidation and improve the lubricating properties thereof, plasticizers and softeners for resins and synthetic elastomers, and as solvents.

The expressions "esters" and "phosphonic acid" as used herein are intended to include thioesters and thiophosphonic acids where the context permits. By radicals of organic monohydroxy compounds or their analogs, is meant the radicals R' and R'' of monohydroxy alcohols, monohydroxy phenols and their thioanalogs of the formulae R'AH and R''AH.

Since certain changes may be made without departing from the scope of the invention, it is intended that the above description shall be interpreted in an illustrative sense.

I claim:

1. As a new composition of matter a compound selected from the group consisting of:

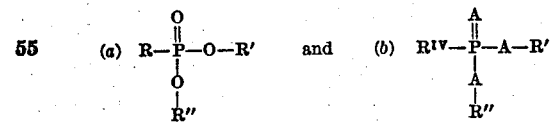

wherein R is a radical selected from the class consisting of ac-indenyl radicals and hydrogenated ac-indenyl radicals and their homologs; R' and R'' are radicals selected from the class consisting of hydrocarbon radicals and chlorinated hydrocarbon radicals; R$^{IV}$ represents a radical selected from the group consisting of ac-indenyl radicals and their homologs; and A represents a bivalent radical selected from the class consisting of —O— and —S—.

2. A compound having the formula

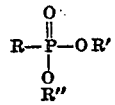

wherein R is the 2-indenyl radical, R' and R'' are radicals selected from the class consisting of hydrocarbon radicals and chlorinated hydrocarbon radicals.

3. As a new compound the dibutyl ester of 2-indene phosphonic acid.

4. As a new compound the dicyclohexyl ester of 2-indene phosphonic acid.

5. A process for preparing phosphonic acid diesters having the formula

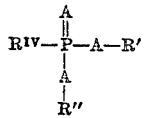

wherein $R^{IV}$ represents a radical selected from the group consisting of the ac-indenyl radicals and their homologs, R' and R'' are radicals selected from the class consisting of hydrocarbon radicals and chlorinated hydrocarbon radicals and A represents a bivalent radical selected from the class consisting of —O— and —S—, which process comprises reacting a member selected from the group consisting of indene and homologs of indene with phosphorus pentachloride and reacting the resultant reaction product with at least one member of the group consisting of monohydroxy substituted hydrocarbons and monohydroxy substituted chlorinated hydrocarbons and their thioanalogs in the presence of a hydrogen chloride accepting agent.

6. A process as specified in claim 5 involving the further step of hydrogenating the diesters in which A is oxygen to saturate at least one of the double bonds of the radical $R^{IV}$.

7. A process for preparing phosphonic acid diesters which comprises reacting phosphorus pentachloride with indene and reacting the resultant reaction product with at least one member selected from the group consisting of monohydroxy substituted hydrocarbons and monohydroxy substituted chlorinated hydrocarbons in the presence of a hydrogen chloride accepting agent.

8. The process as defined in claim 7 in which the hydrogen chloride accepting agent is a tertiary amine.

9. The process as defined in claim 7 in which said hydrogen chloride accepting agent is pyridine.

WILBER O. TEETERS.

REFERENCES CITED

The following references are of record in the file of this patent:

UNITED STATES PATENTS

| Number | Name | Date |
|---|---|---|
| 2,226,552 | Conary et al. | Dec. 31, 1940 |
| 2,279,501 | Dickey | Apr. 14, 1942 |
| 2,279,502 | Dickey | Apr. 14, 1942 |
| 2,286,792 | Dickey | June 16, 1942 |
| 2,286,794 | Dickey | June 16, 1942 |
| 2,365,466 | Hamilton | Dec. 19, 1944 |
| 2,389,576 | Kosolapoff | Nov. 20, 1945 |

OTHER REFERENCES

Bergmann: "Berichte Deut. Chem. Gesell.," vol. 63, pp. 1158 to 1173 (1930); ibid., vol. 64, pp. 1455 to 1480 (1930).

Drake: "Jour. Org. Chem.," vol. 2, pp. 387 to 399 (1937).

Karrer: "Organic Chemistry," 1st English ed. (1938), page 848.

"Chemical Industries," vol. 55, page 581 (October 1944).

Beilstein: "Handbuch der Org. Chem.," 4th ed., vol. XVI, pp. 817 and 819.